(12) United States Patent
Nagamura et al.

(10) Patent No.: US 6,292,239 B1
(45) Date of Patent: Sep. 18, 2001

(54) LIQUID CRYSTAL DISPLAY HAVING FRAME TO HOLD THE PANEL AND THE BACK LIGHT UNIT USING NOTCH AND TABS

(75) Inventors: Yoshiaki Nagamura, Kobe; Shuji Yasuoka, Hirakata, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/205,285

(22) Filed: Dec. 4, 1998

(30) Foreign Application Priority Data

May 28, 1998 (JP) .................................................. 10-147132
Jun. 5, 1998 (JP) .................................................. 10-157305

(51) Int. Cl.[7] .......................... G02F 1/1333; G02F 1/1335
(52) U.S. Cl. .................................................. 349/58; 349/61
(58) Field of Search .................................. 349/58, 57, 60; 361/681; 362/30

(56) References Cited

U.S. PATENT DOCUMENTS

| | | | |
|---|---|---|---|
| 5,280,372 | * 1/1994 | Horiuchi | 359/49 |
| 5,442,470 | * 8/1995 | Hashimoto | 359/83 |
| 5,666,172 | * 9/1997 | Ida et al. | 349/58 |
| 5,684,673 | * 11/1997 | Shibasaki et al. | 364/686 |
| 6,034,751 | * 3/2000 | Kamiya | 349/60 |
| 6,163,350 | * 12/2000 | Ihara | 349/58 |

FOREIGN PATENT DOCUMENTS

| | | |
|---|---|---|
| 10068826 A | 3/1998 | (JP) . |
| 10068857 A | 3/1998 | (JP) . |
| 10-123514 | 5/1998 | (JP) . |

* cited by examiner

Primary Examiner—Kenneth Parker
Assistant Examiner—Mike Qi
(74) Attorney, Agent, or Firm—Wenderoth, Lind & Ponack L.L.P.

(57) ABSTRACT

A liquid crystal display is characterized by uniting a liquid crystal panel and a back light unit by a frame into a liquid crystal panel unit and then installing the liquid crystal panel unit in a cabinet. The frame is divided into two portions of an inner wall by a supporting shelf that extends around the inner wall at a first predetermined distance measured from one side edge of the inner wall. In these two portions of the inner wall, a liquid crystal panel containing frame is formed for containing the liquid crystal panel, and a back light unit containing frame is formed for containing the back light unit. Thus, the liquid crystal panel unit is constructed by containing the liquid crystal panel and back light unit in those two containing frames.

19 Claims, 13 Drawing Sheets

Fig. 16A                Fig. 16B
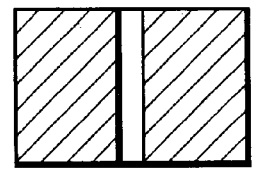   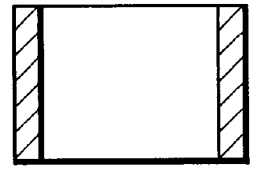
Fig. 17    PRIOR ART
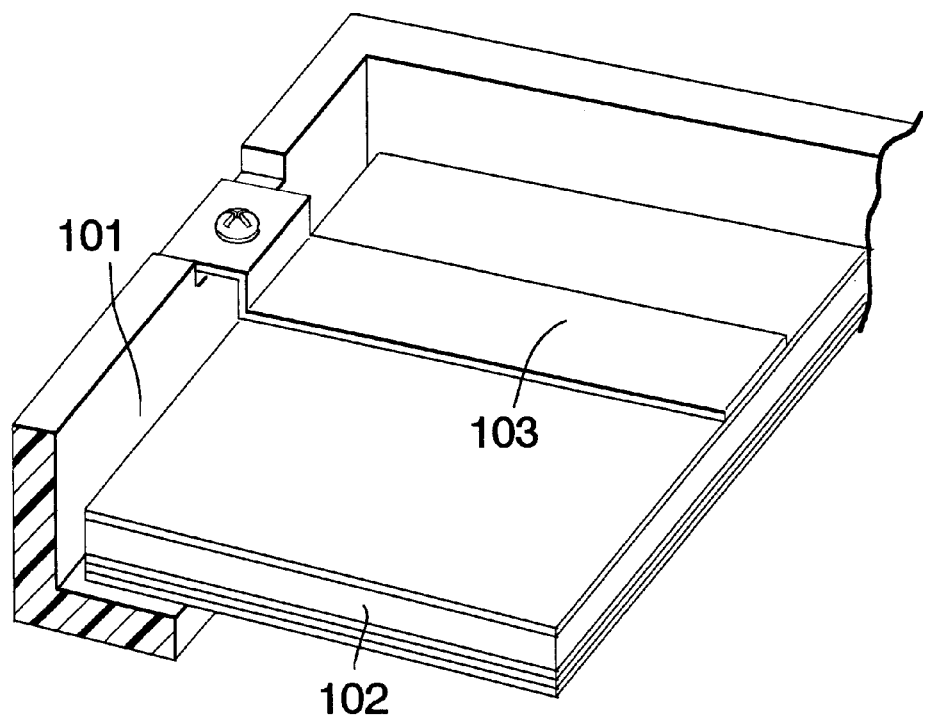

LIQUID CRYSTAL DISPLAY HAVING FRAME TO HOLD THE PANEL AND THE BACK LIGHT UNIT USING NOTCH AND TABS

BACKGROUND OF THE INVENTION

1. Field of the Invention

The present invention relates generally to a liquid crystal display used for a personal computer or the like, and more particularly, to a frame structure suitable for realization of a thin and lightweight liquid crystal display and the structure of a back light unit in the liquid crystal display.

2. Description of the Background Art

A frame constituting a liquid crystal panel unit for use in a liquid crystal display has been conventionally used for holding a liquid crystal panel and a back light unit. The back light unit is constituted by a plurality of components which are represented by a lens sheet, a photoconductive plate, a diffusion sheet, a reflection sheet, and an electric-discharge lamp. Therefore, it is necessary to fix the back light unit separately using a holding component in order to complete the liquid crystal display.

FIGS. 17 and 18 illustrate respectively examples of frame structures for a liquid crystal display which have been conventionally employed. In the frame structure shown in FIG. 17, a photoconductive plate 102 is only put on a frame 101. Therefore, the photoconductive plate 102 is fixed to the frame 101 using a fastener 103 in order to complete the liquid crystal display.

In the frame structure shown in FIG. 18, a frame 104 is held in a sheathing plate 107, only to hold a photoconductive plate 105 and a liquid crystal panel 106. Therefore, a liquid crystal unit 109 is fixed to a cabinet of the main body of the liquid crystal display by a screw hole 108 provided in the sheathing plate 107. The above-mentioned conventional liquid crystal display is thus constituted by a frame for supporting each of components constituting the back light unit, a fastening component for fastening the frame and the components constituting the back light unit, and a sheathing plate for holding the frame. Therefore, the number of components is large, so that the liquid crystal display is thick and is heavy.

At the same time, the liquid crystal display is widely employed for applications such as a portable notebook-sized personal computer and a portable liquid crystal TV. Such a portable liquid crystal display is driven by a battery, so that power consumed by the liquid crystal display prevents battery life from being lengthened. Power consumed by a back light used for the liquid crystal display is very large in the consumed power. The optical efficiency of the back light is improved, to increase the luminance of a display screen by small consumed power, thereby lengthening the battery life.

FIG. 19 illustrates the general construction of such a back light. In FIG. 19, reference numeral 50 denotes a light source such as an electric-discharge lamp, which is arranged opposite to a side surface of a photoconductive plate 51. In order to effectively introduce light into the photoconductive plate 51 from the light source 50, the rear surface of the light source 50 is covered with a reflection sheet 52. A reflection sheet 53 is closely superimposed on the lower surface of the photoconductive plate 51, and a diffusion plate 54 and lens sheets 55 and 56 are closely superimposed on the upper surface thereof, to constitute a back light unit 57. A liquid crystal panel 58 is arranged at some distance above the back light unit 57, to constitute a liquid crystal panel unit.

Light irradiated from the light source 50 is incident on the photoconductive plate 51, and the light travels in the photoconductive plate 51 to expand over the whole surface thereof, and is incident on the lens sheets 55 and 56 through the diffusion plate 54. The incident light is refracted in the lens sheets 55 and 56 toward a viewer, to converge in his or her field of vision at an angle of less than approximately 70 degrees. Light which reaches the viewer is doubled by inserting the lens sheets 55 and 56. Each of the lens sheets 55 and 56 is constructed by arranging very small prisms on a transparent film. The lens sheets 55 and 56 are made different in the angles of view in the X and Y directions by making the directions in which the prisms are arranged perpendicular to each other. In FIG. 19, an array of prisms in the lens sheet 56 is drawn in a vertical direction, and the lens sheet 55 is drawn in a horizontal direction. The optical efficiency of the back light is improved by arranging the lens sheets 55 and 56 thus constructed in a correct direction and in a correct order on the diffusion plate 54, thereby making it possible to increase the luminance of the display screen of the liquid crystal display by small consumed power.

FIG. 20 illustrates an example of positioning of lens sheets in a conventional back light unit. In FIG. 20, reference numeral 59 denotes a supporting member for supporting lens sheets 55 and 56, and reference numeral 60 denotes a notch provided at corners of the lens sheets 55 and 56. The notch 60 prevents one of the surface and the reverse surface of each of the lens sheets 55 and 56 from being mistaken for the other in assembling the lens sheets.

In this method, however, it is difficult to find out, even if in inherently inserting two lens sheets, insertion of one of them is forgotten, that the insertion has been forgotten. It is impossible to confirm the order in which the lens sheets 55 and 56 are inserted even if they are both inserted. Further, the diffusion plate 54, the photoconductive plate 51, and the reflection sheet 53 are inserted with them being superimposed on the lens sheet 56, and thus it cannot be physically confirmed whether or not the components constituting the back light unit 57 are correctly mounted after completion of the back light unit 57.

Therefore, a unit has been conventionally inspected by mounting the liquid crystal panel 58 and operating the display screen to observe the luminance, the viewing angle, and so forth. As a result of the inspection, there are only measures to drop the component constituting the back light unit 57, whose operation is judged to be abnormal, from an assembly line, and decompose and repair the liquid crystal panel 58 and the back light unit 57.

Therefore, the present invention makes, as a personal computer is made small in size, thin, and lightweight, a liquid crystal display carried thereon small in size, thin, and lightweight. Further, an object of the present invention is to provide a back light unit, in the liquid crystal display, capable of preventing one of the surface and the reverse surface of each of lens sheets to be inserted from being mistaken for the other and preventing an erroneous number of lens sheets from being inserted in assembly processes of the back light unit as well as visually confirming the number of lens sheets to be inserted and the order in which the lens sheets are inserted even after assembling the back light unit.

SUMMARY OF THE INVENTION

A first aspect of the present invention is directed to a liquid crystal display wherein a liquid crystal panel for displaying an image and a back light unit for lighting the liquid crystal panel from the backside thereof so that the liquid crystal panel displays the image clearly are united into a liquid crystal panel unit by a frame and installed in a cabinet.

The frame comprises:
  a projection extending around an inner wall at a first predetermined distance measured from one side edge of the inner wall and parallel to the side edge to divide the inner wall into two portions;
  a first container, formed by the projection and one portion of the inner wall having a width defined by a first predetermined distance from the projection, for containing the liquid crystal panel therein; and
  a second container, formed by the projection and the other portion of the inner wall, for containing the back light unit therein,
  wherein the liquid crystal panel and the back light unit are united into the liquid crystal panel unit by the frame.

As is apparent from the above, according to the first aspect of the present invention, a liquid crystal panel and a back light unit can be united by only one frame, thereby reducing the number of supporting tools.

According to a second aspect of the present invention, in the first aspect, the frame further includes claws provided in the inner wall of the second container at a position at a second predetermined distance from the projection, for securely holding the back light unit contained in the second container.

As is apparent from the above, according to the second aspect of the present invention, the back light unit is securely held so that the back light unit is free from an accidental detachment from the frame during an installation of the liquid crystal panel unit into the cabinet.

According to a third aspect of the present invention, in the second aspect, the frame is made of a resin material.

As is apparent from the above, according to the third aspect of the present invention, the frame is made of a resin material having much elasticity so as to easily contain the liquid crystal panel or the back light unit therein.

According to a fourth aspect of the present invention, in the first aspect, the frame further comprises:
  a fastening unit for fastening itself to a cabinet.

As is apparent from the above, according to the fourth aspect of the present invention, a secured fastening of the liquid crystal panel unit to the cabinet is realized by fastening the fastening unit of the frame to the cabinet.

According to a fifth aspect of the present invention, in the first aspect, the first predetermined distance is greater than a thickness of the liquid crystal panel.

As is apparent from the above, according to the fifth aspect of the present invention, the first container or liquid crystal panel containing frame extends beyond a glass surface of the liquid crystal panel contained therein, so that the liquid crystal panel containing frame protects the glass surface of the liquid crystal panel against a pressure applied to the cabinet in which the frame containing the liquid crystal panel is installed.

According to a sixth aspect of the present invention, in the second aspect, the second predetermined distance is greater than a thickness of the back light unit.

As is apparent from the above, according to the sixth aspect of the present invention, the distance between the supporting shelf of the second container or the back light unit containing frame and the claws is greater than a thickness of the back light unit, thereby enabling the back light unit containing frame to easily contain the back light unit therein.

According to a seventh aspect of the present invention, in the second aspect, the claws include:
  a first holding claw formed in a flat shape; and
  a second holding claw formed in an arched shape such that an arched surface is disposed to an open side of the inner wall opposite to the projection, so that the back light unit is first inserted into a space between the first holding claw and the projection, and then the back light unit placed on the arched surface of the second holding claw is pressed against the arched surface so as to slide the back light unit into the second container along the arched surface.

As is apparent from the above, according to the seventh aspect of the present invention, two kinds of claws respectively formed in a flat shape and an arched shape enables the back light containing frame to accept and hold the back light unit therein easily.

According to an eighth aspect of the present invention, in the first aspect, the liquid crystal panel is fixed to the first container by an adhesive.

As is apparent from the above, according to the eighth aspect of the present invention, the liquid crystal panel is fixed to the liquid crystal panel containing frame so that the liquid crystal panel is free from an accidental detachment during the installment of the liquid crystal panel unit in the cabinet.

According to a ninth aspect of the present invention, in the first aspect, the back light unit includes an electric-discharge lamp for lighting the liquid crystal panel; and
  the second container further includes a holding unit for holding an end portion of the electric-discharge lamp.

As is apparent from the above, according to the ninth aspect of the present invention, the electric-discharge lamp for lighting the liquid crystal panel is also easily contained in the back light containing frame.

According to a tenth aspect of the present invention, in the fourth aspect, the cabinet is made of a material selected from a group consisting of magnesium alloy and aluminum alloy.

As is apparent from the above, according to the tenth aspect of the present invention, a strong and light cabinet can be provided.

According to an eleventh aspect of the present invention, in the tenth aspect, the cabinet includes:
  a first pressing unit provided on an upper side of the fastening unit for pressing an end portion of the side wall of the frame against a bottom portion of the cabinet, so that the liquid crystal panel unit can be firmly installed in the cabinet by the fastening unit and the first pressing unit.

As is apparent from the above, according to the eleventh aspect of the present invention, the liquid crystal panel unit can be firmly installed in the cabinet on the two portions opposite to each other.

According to a twelfth aspect of the present invention, in the eleventh aspect, the fastening unit further includes a second pressing unit for pressing the end portion of the side wall of the frame against the bottom portion of the cabinet, so that the liquid crystal panel unit can be more firmly installed in the cabinet by the first and second pressing units, and the fastening unit.

As is apparent from the above, according to the twelfth aspect of the present invention, the liquid crystal panel unit can be more firmly installed in the cabinet at three portions.

According to a thirteenth aspect of the present invention, in the first aspect, the back light unit includes:
  a first lens sheet having a first tab formed in a first predetermined shape and having first predetermined viewing angle characteristics; and a second lens sheet having a second tab formed in a second predetermined shape and having second predetermined viewing angle characteristics;

wherein the second container includes only one notch portion for containing the first and second tabs, so that the first and second tabs partially overlap with each other and the first and second viewing angle characteristics are different from each other when the first and second lens sheets are contained in the second container.

As is apparent from the above, according to the thirteenth aspect of the present invention, observation of tabs of the lens sheets contained in the frame enables distinguishing the insertion manner of the lens sheets.

According to a fourteenth aspect of the present invention, in the thirteenth aspect, the notch portion is shifted by a predetermined distance from the center of a side wall of the second container.

As is apparent from the above, according to the fourteenth aspect of the present invention, the lens sheets can be inserted into the back light containing frame with the lens sheets sides facing in the right directions.

According to a fifteenth aspect of the present invention, in the seventh aspect, the first holding claw is provided in a position at a third predetermined distance from the projection;

the second holding claw is provided in a position at a fourth predetermined distance from the projection; and a relation of the thickness of the back light unit ≦ the third predetermined distance ≦ the fourth predetermined distance is satisfied.

As is apparent from the above, according to the fifteenth aspect of the present invention, the back light unit is inserted below the flat-shaped first holding claw and then deformed on the arch-shaped second holding claw. Thus, the back light unit can be inserted below the second holding claw.

According to a sixteenth aspect of the present invention, in the seventh aspect, the first holding claw is provided in a position at a third predetermined distance from the projection;

the second holding claw is provided in a position at a fourth predetermined distance from the projection; and a relation of the third predetermined distance < the thickness of the back light unit < the fourth predetermined distance is satisfied.

As is apparent from the above, in the sixteenth aspect of the present invention, in a state where the back light unit is elastically fastened between the flat-shaped first holding claw and the projection to be securely held, the back light unit is deformed on the arch-shaped second holding claw prior to be inserted below the second holding claw.

According to a seventeenth aspect of the present invention, in the seventh aspect, the frame has three inner walls at least;

the first holding claw is provided on a first inner wall among the three inner walls; and the second holding claw is provided on a second inner wall adjacent to the first inner wall.

According to an eighteenth aspect of the present invention, in the seventh aspect, the frame has three inner walls at least;

the first holding claw is provided on a first inner wall among the three inner walls; and the second holding claw is provided on a second inner wall which is distant from the first inner wall by at least one or more inner walls.

According to a nineteenth aspect of the present invention, in the seventh aspect, the frame has four inner walls at least;

the first holding claw is provided on a first wall among the four inner walls; and the second holding claw is provided on an inner wall opposite to the first inner wall.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 16A and 16B are explanatory views showing how tabs in a notch portion of the lens sheet according to the second embodiment are seen;

FIG. 17 is a sectional perspective view showing a holding structure of components constituting a back light unit in a conventional liquid crystal panel unit;

DESCRIPTION OF THE PREFERRED EMBODIMENTS

Figure 1:
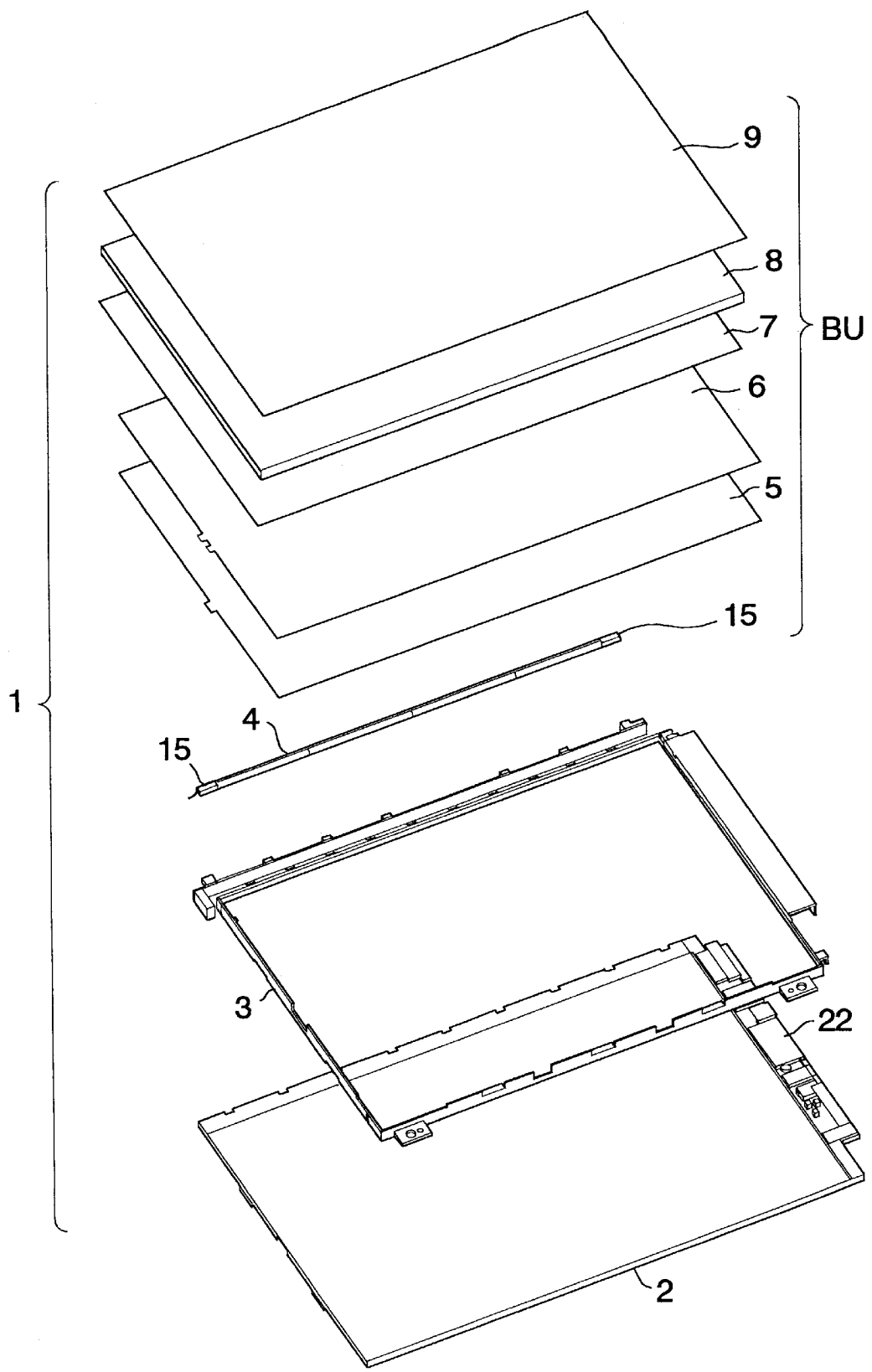
FIG. 1 is an exploded perspective view of a liquid crystal panel unit for use in a liquid crystal display according to a first embodiment of the present invention.

An embodiment of the present invention will be described in detail while referring to the drawings.

First Embodiment

Referring to FIGS. 1, 2, 3, 4, 5, 6, 7, 8 and 9, a liquid crystal display according to a first embodiment of the present invention will be described.

Referring now to FIG. 1, description is made of the construction of the liquid crystal display according to the present embodiment. The liquid crystal display comprises a liquid crystal panel unit 1, which is constituted by a liquid crystal panel 2, a resin frame 3, an electric-discharge lamp 4, a first lens sheet 5, a second lens sheet 6, a diffusion plate 7, a photoconductive plate 8, and a reflection sheet 9. The electric-discharge lamp 4, the first lens sheet 5, the second lens sheet 6, the diffusion plate 7, the photoconductive plate 8, and the reflection sheet 9 are referred to as a back light unit BU.

The liquid crystal panel 2 is constructed by sealing a liquid crystal between two glass substrates each having a predetermined board thickness Tp (Tp=0.7 to 1.0 mm) and sealing its side surface, and has a liquid crystal driving circuit board 22.

The resin frame 3 is a rectangular frame produced using resin such as ABS, PC (polycarbonate), PBT, a PC/ABS alloy, polyester, or polyurethane or a material obtained by adding a glass fiber, a carbon fiber, or the like to such resin. A side wall L of the resin frame 3 (FIG. 3) can be mainly formed to a wall thickness Tw which is not more than 1 mm using a resin molding method.

The electric-discharge lamp 4 is a glass tube having a diameter of approximately 2 mm, and rubber holders 15 are respectively mounted on both ends of the electric-discharge lamp 4. Each of the first lens sheet 5 and the second lens sheet 6 is obtained by arranging an array of very small prisms on a polyester film having a predetermined film thickness T1 (T1=about 0.1 mm).

The diffusion plate 7 is obtained by forming convexities and concavities on the surface of the polyester film having a predetermined film thickness Tf (Tf=about 0.1 mm). The photoconductive plate 8 is an acrylic board having a predetermined board thickness Tc (Tc=about 1 to 2 mm). The reflection sheet 9 is a white resin sheet having a predetermined sheet thickness Tr (Tr=about 0.2 mm).

Figure 2:
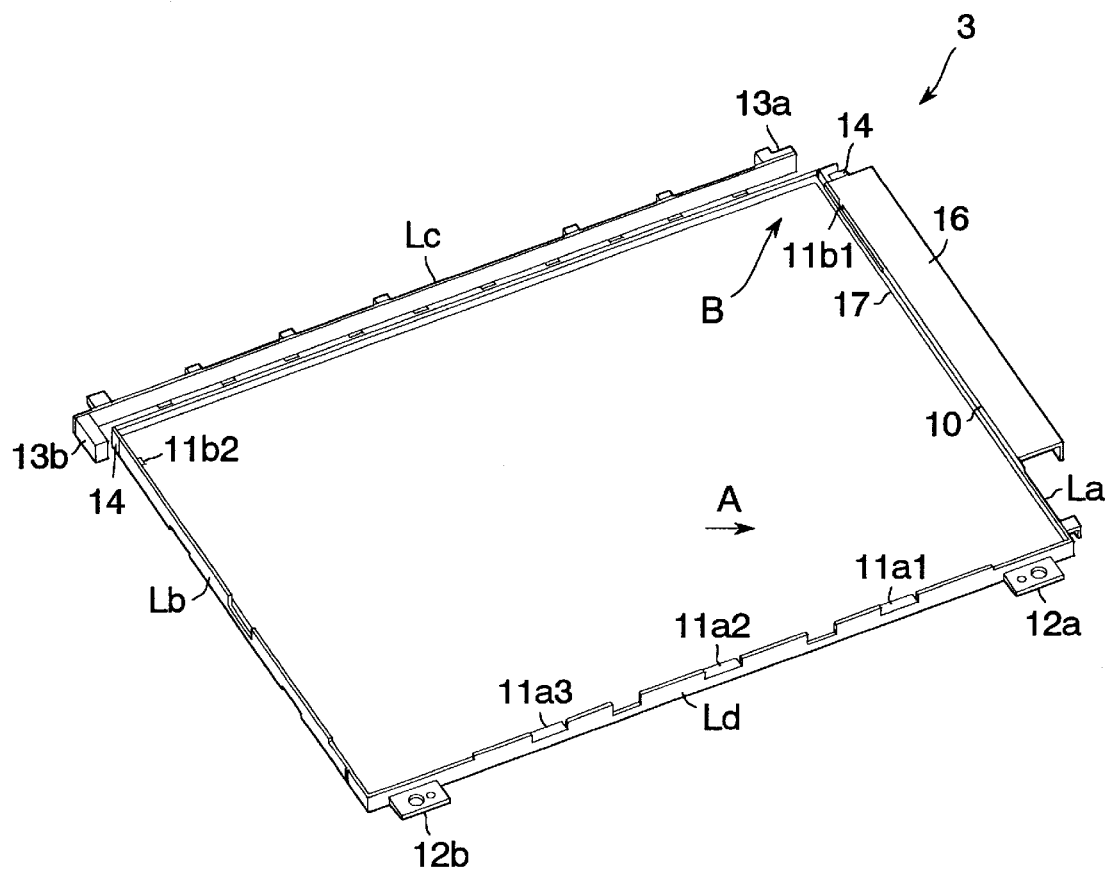
FIG. 2 is a perspective view of a resin frame shown in FIG. 1.
Figure 3:
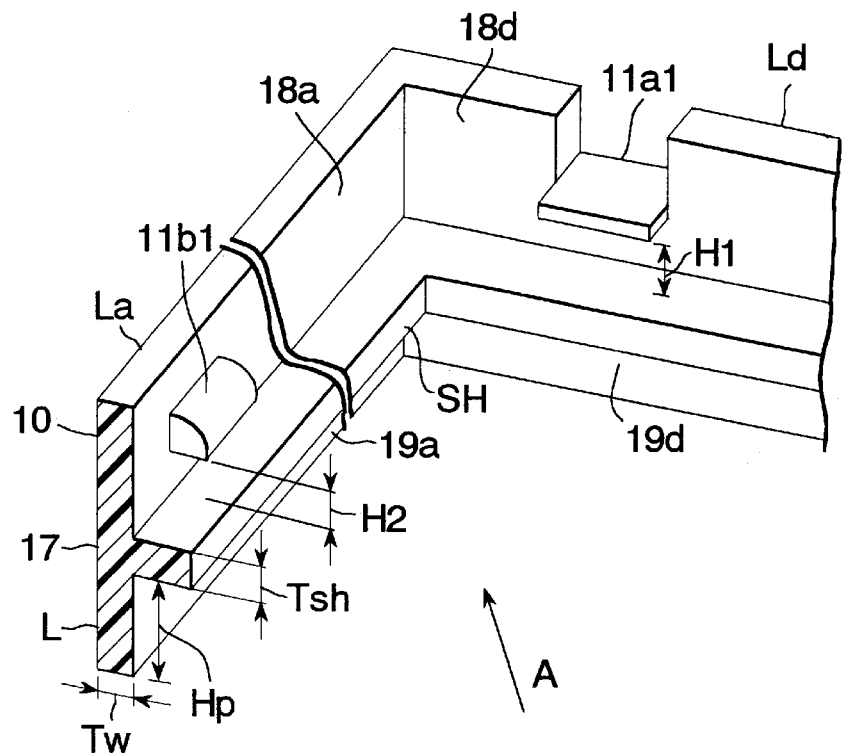
FIG. 3 is an enlarged view showing the resin frame as viewed in the direction of arrow A as shown in FIG. 2.

Referring to FIGS. 2 and 3, description is made of the structure of the resin frame 3. As shown in FIG. 2, the resin frame 3 is a rectangular frame which is constituted by four side walls La, Lb, Lc and Ld. The side walls La and Lb are parallel and opposite to each other. Similarly, the side walls Lc and Ld are parallel and opposite to each other. As a result, the side walls La and Lc and the side walls Lb and Ld are respectively perpendicular to each other.

The resin frame 3 has a back light component containing frame 10, first back light component holding claws 11a1, 11a2 and. 11a3, second back light component holding claws 11b1 and 11b2, fastening portions 12a and 12b, holder holding portions 13a and 13b, holding claws 14, a protecting cover 16, and a liquid crystal panel containing frame 17.

As shown in FIG. 3, on each of the inner wall surfaces of side walls La, Lb (not shown), Lc (not shown) and Ld of the resin frame 3, a supporting shelf SH having a board thickness Tsh, protrudes approximately perpendicularly from the inner wall surfaces and extends in a direction parallel to the length of each of the side walls La, Lb, Lc and Ld. The inner wall surface of the resin frame 3 is divided into upper portions of inner walls 18a, 18b (not shown), 18c (not shown) and 18d, and lower portions of inner walls 19a, 19b (not shown), 19c (not shown) and 19d. The inner wall portions 18a and 19a, 18b and 19b, 18c and 19c, and 18d and 19d are respectively the inner wall surfaces of the side walls La, Lb, Lc and Ld.

The first back light component holding claws 11a1, 11a2 and 11a3 are provided with predetermined spacing on the inner wall portion 18d. The holding claws 11a1, 11a2 and 11a3 are flat plate-shaped claws, and their lower surfaces are positioned at a predetermined height H1 from the upper surface of the supporting shelf SH. Similarly, the second back light component holding claws 11b1 and 11b2 are provided in the vicinities of the side wall Lc on the inner wall portions 18a and 18b. The holding claws 11b1 and 11b2 are guiding claws each having a circular arc-shaped upper surface, and their lower surfaces are positioned at a predetermined height H2 from the upper surface of the supporting shelf SH. The heights H1 and H2 are substantially the same. In FIG. 3, only the first back light component holding claws 11a1 and the second back light component holding claw 11b1 are illustrated for convenience of simplicity.

A back light component containing frame 10 is formed inside the resin frame 3 by the supporting shelf SH, the inner wall portions 18a, 18b, 18c and 18d, and the back light component holding claws 11a1, 11a2, 11a3, 11b1 and 11b2. Components constituting the back light unit which are represented by the first lens sheet 5, the second lens sheet 6, the diffusion plate 7, the photoconductive plate 8, and the reflection sheet 9 are contained in the back light component containing frame 10.

The fastening portions 12a and 12b are respectively provided at both ends of an outer side part of the side wall Ld, and are used for mounting the resin frame 3 on a cabinet (not shown) of the main body of the liquid crystal display with a liquid crystal panel unit 1 held therein.

The holder holding portions 13a and 13b are provided at both ends of the side wall Lc, to hold the rubber holders 15 mounted on the electric-discharge lamp 4. Further, holding claws 14 are respectively provided in the vicinities of the holder holding portions 13a and 13b, to hold the rubber holders 15 mounted on the electric-discharge lamp 4.

The protecting cover 16 is provided on the side wall La and in the vicinity of the side wall Lc with it being projected outward. The protecting cover 16 is provided in order to cover and protect the liquid crystal driving circuit board 22 of the liquid crystal panel 2 when the liquid crystal display is assembled, as shown in FIG. 1.

On the other hand, the liquid crystal panel containing frame 17 is formed inside the resin frame 3 by the supporting shelf SH and the inner wall portions 19a, 19b, 19c and 19d. The liquid crystal panel containing frame 17 contains the liquid crystal panel 2 when the liquid crystal display is assembled, as shown in FIG. 1.

The above-mentioned components constituting the back light unit are thus incorporated in the back light component containing frame 10 and the liquid crystal panel containing frame 17 in the resin frame 3, to complete the liquid crystal panel unit 1. The liquid crystal panel unit 1 is mounted on the cabinet (not shown) of the main body of the liquid crystal display by the fastening portions 12a and 12b in the resin frame 3.

Since the resin frame 3 has a small wall thickness, the frame strength of each of the components is low. Therefore, the resin frame 3 is simply deformed when a force is applied thereto. However, the liquid crystal panel unit 1 has sufficient strength in a state where the liquid crystal panel 2 and the photoconductive plate 8 are mounted on the upper and lower sides of the resin frame 3.

Referring now to FIGS. 3, 4, 5 and 6, description is made of a method of assembling the liquid crystal panel unit 1.

As shown in FIG. 3, the back light component containing frame 10 and the liquid crystal panel containing frame 17 are spaced apart from each other by the supporting shelf SH having a board thickness Tsh. The board thickness Tsh is determined on the basis of optical path lengths between the lens sheets 5 and 6 and the liquid crystal panel 2 at the time point where all the components constituting the back light unit are carried on the resin frame 3 to complete the liquid crystal panel unit 1. The side surfaces of the four sides of the lens sheets 5 and 6, the photoconductive plate 8, the diffusion sheet 7, and the reflection sheet 9 are positioned by the inner wall portions 18a, 18b, 18c and 18d of the back light component containing frame 10, and the side surfaces of the four sides of the liquid crystal panel 2 are positioned by the inner wall portions 19a, 19b, 19c and 19d of the liquid crystal panel containing frame 17. After completion of the liquid crystal display, the side walls La, Lb, Lc and Ld perform the functions of protecting the liquid crystal display against dust and shielding light.

Figure 4:
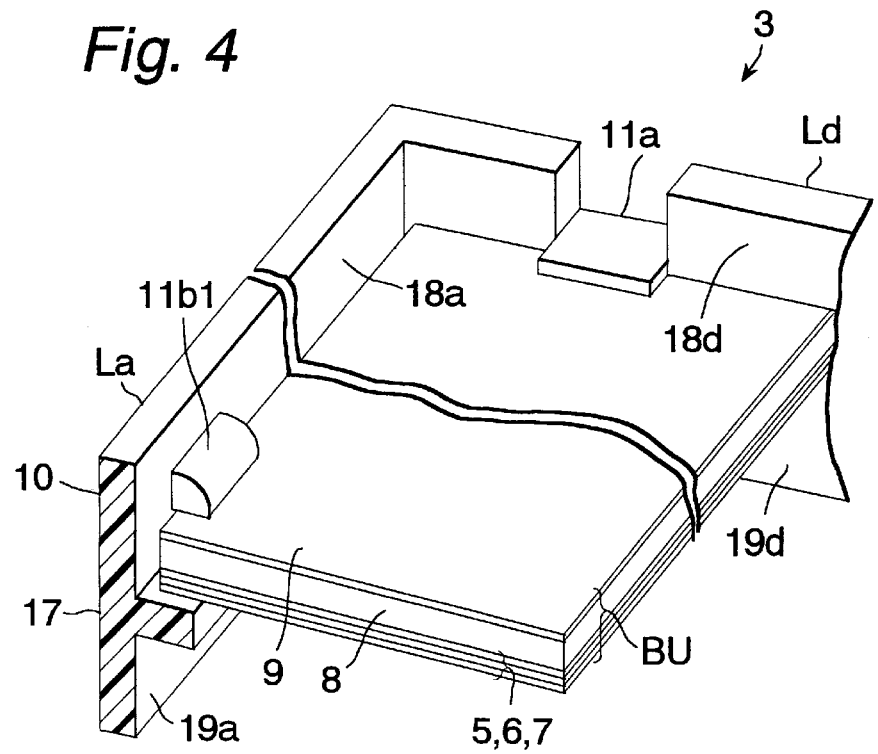
FIG. 4 is a partial perspective view showing a state where a back light unit is contained in a back light component containing frame in the resin frame shown in FIG. 3.

Referring to FIGS. 3 and 4, description is made of a method of containing the components constituting the back light unit in the back light component containing frame 10 in the resin frame 3. The lens sheets 5 and 6, and the diffusion sheet 7 are first laminated in the back light component containing frame 10 in this order along the inner walls 18a, 18b, 18c and 18d. Since the sheets are thin and soft, they can be inserted while avoiding the flat plate-shaped claws 11a1, 11a2 and 11a3 and the guiding claws 11b1 and 11b2 each having a circular arc-shaped upper surface. The photoconductive plate 8 is then superimposed on the diffusion sheet 7. Since the photoconductive plate 8 has relatively high rigidity it cannot be contained while avoiding the claws 11a1, 11a2, 11a3, 11b1 and 11b2.

Since the resin frame 3, and the claws 11b1 and 11b2 have flexibility, however, the photoconductive plate 8 can be contained in the back light component containing frame 10 in accordance with the following procedure. One side of the photoconductive plate 8 is first inserted below the claws 11a1, 11a2 and 11a3, and the photoconductive plate 8 is put on the two guiding claws 11b1 and 11b2. Portions, corresponding to the circular arc-shaped upper surfaces of the claws 11b1 and 11b2, of the photoconductive plate 8 are pressed down by hand. Consequently, three edges of the photoconductive plate 8 are positioned where they hit against the inner walls 18a, 18b and 18c. The other edge of the photoconductive plate 8 drops inside the back light component containing frame 10 along the circular arc-shaped upper surfaces of the claws 11b1 and 11b2.

In the same manner, the reflection sheet 9 is finally superimposed on the photoconductive plate 8. Spaces H1 and H2 between the bottom of the back light component containing frame 10 (the upper surface of the supporting shelf SH) and the lower surfaces of the claws 11a1, 11a2, 11a3, 11b1 and 11b2 are set to thicknesses slightly larger than the total thickness H of the lens sheets 5 and 6, the diffusion sheet 7, the photoconductive plate 8, and the reflection sheet 9. That is to say, the spaces H1 and H2 between the upper surface of the supporting shelf SH, and the lower surfaces of the flat-shaped claws 11a1, 11a2 and 11a3 and the lower surfaces of the arc-shaped claws 11b1 and 11b2 are respectively represented by an equation of H1=H+ΔH1 (ΔH1 is a predetermined dimensional tolerance) and an equation of H2=H+ΔH2 (ΔH2 is a predetermined dimensional tolerance). The spaces H1 and H2 are substantially the same, which means ΔH1=ΔH2, as described in the above. Consequently, the components constituting the back light unit are reliably held in the resin frame 3 by the elasticity of the claws 11a1, 11a2, 11a3, 11b1 and 11b2 and the reflection sheet 9. In the actual process, the components constituting the back light unit can be inserted and held in one operation by fixing respective ends of the diffusion plate 7, the photoconductive plate 8, and the reflecting plate 9 with tape. The flatness of the resin frame 3 is corrected by the photoconductive plate 8 which is rigid. The electric-discharge lamp 5 is mounted thereon, to complete the mounting of the components constituting the back light unit.

The back light unit BU combined by tape and the like is inserted mostly parallel to the space between the flat-shaped claws 11a1, 11a2 and 11a3 and the supporting shelf SH. On the other hand, with respect to the space (H2) between the arc-shaped claws 11b1 and 11b2 and the supporting shelf SH, the combined back light unit BU is pressed against the circular arc-shaped upper surfaces of the arc-shaped claws 11b1 and 11b2, and then inserted beneath these claws 11b1 and 11b2 while they are deformed. At this time, the edge of the back light unit BU is deformed upward with respect to the arc-shaped claws 11b1 and 11b2, the arc-shaped claws 11b1 and 11b2 are deformed downward, and the resin frame 3 is deformed outward. Thus, in a state where each component is deformed, when the upper surface of the edge of the back light unit BU is positioned below the arc-shaped claws 11b1 and 11b2, the edge of the back light unit BU is inserted into the space (H2) between the arc-shaped claws 11b1 and 11b2 and the supporting shelf SH. In this case, the deformed edge of the back light unit BU proceeds in the space (H2) toward the inner wall 18a while returning to its original shape. Eventually, the back light unit BU is contained in the back light component containing frame 10. In consideration of such insertion mechanism of the back light unit BU into the back light component containing frame 10, the dimensional tolerances ΔH1 and ΔH2 on the heights H1 and H2 regarding the flat-shaped claws 11a1, 11a2 and 11a3 and the arc-shaped claws 11b1 and 11b2 preferably satisfy a relation of 0≤ΔH1≤ΔH2.

Moreover, when it is desired that the back light unit BU is held by the back light component containing frame 10 more securely, the above relation may be changed into ΔH1≤0≤ΔH2 since the resin frame 3 including the flat-shaped claws 11a1, 11a2 and 11a3 is made of a material having elasticity. In this case, when the back light unit BU is inserted in the space (H1) below the flat-shaped claws 11a1, 11a2 and 11a3, the flat-shaped claws 11a1, 11a2 and 11a3, the supporting shelf SH, and the inner wall 18a are elastically deformed. This allows easy insertion of the back light unit BU regardless of the small space (H1).

In the specification, description is generally made of an example in which the liquid crystal display has a rectangular shape defined by four edges. Therefore, the resin frame 3, the back light unit BU and the liquid crystal panel 4 are described to be rectangular. The present invention, however, can be applied to a liquid crystal display having a polygonal shape defined by three or more edges, as required. In the case where the present invention is applied to the liquid crystal display having a polygonal shape, the flat-shaped claws 11a1, 11a2 and 11a3 and the arc-shaped claws 11b1 and 11b2 can be individually provided on the inner walls including edges which are adjacent to each other.

Furthermore, the flat-shaped claws 11a1, 11a2 and 11a3 and the arc-shaped claws 11b1 and 11b2 may be individually provided on the inner walls forming two edges which are distant from each other by one or more edges.

Alternatively, the flat-shaped claws 11a1, 11a2 and 11a3 and the arc-shaped claws 11b1 and 11b2 may be individually provided on the inner walls which are opposite to each other.

Figure 5:
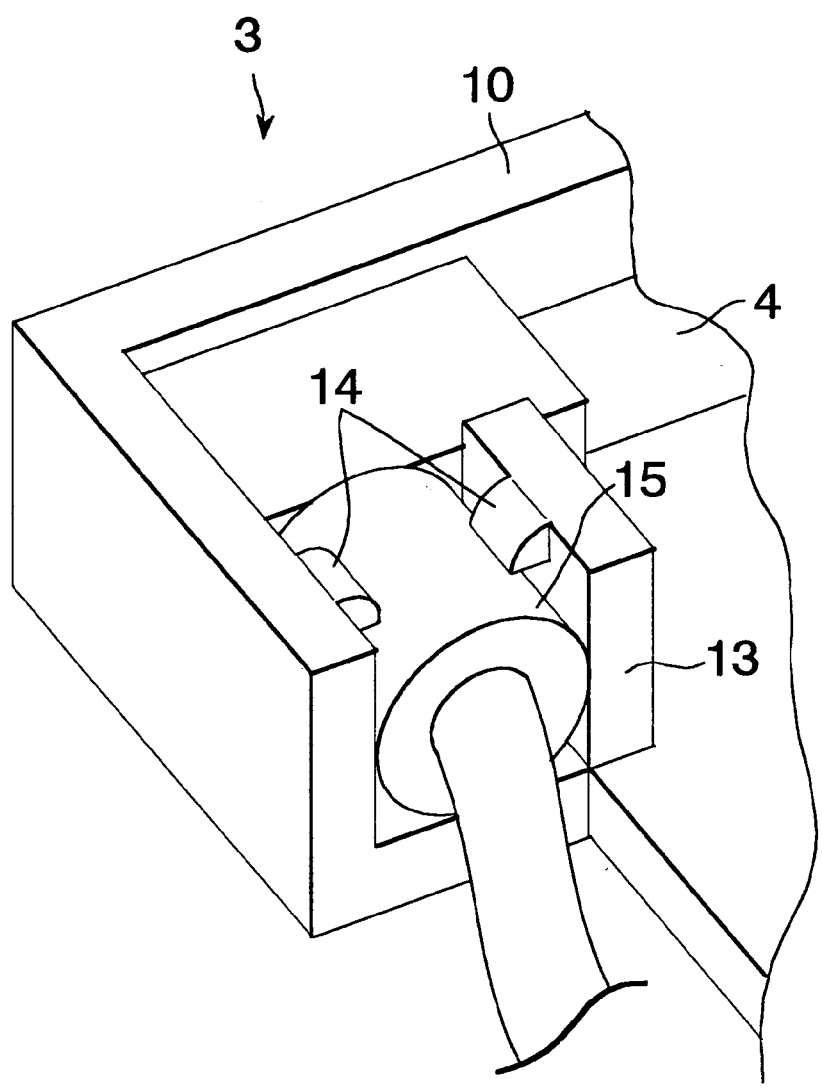
FIG. 5 is an enlarged view showing the resin frame as viewed in the direction of arrow B as shown in FIG. 2.

Referring to FIG. 5, which is a detailed enlarged view of the structure to which is directed arrow B shown in FIG. 2, description is made of a method of mounting the electric-discharge lamp 4 on the resin frame 3. When the rubber holder 15 whose end has a cylindrical shape is put on the holding claw 14, and the rubber holder 15 is pressed down from above, the holder holding portion 13, which supports the holding claw 14, cooperates with the holding claw 14 so that the rubber holder 15 is fixed. Since the shape of the rubber holder 15 is cylindrical, the rubber holder 15 can be easily pressed down, and the holding claw 14 can be mounted low. Therefore, the resin frame 3 can be made thinner.

Figure 6:
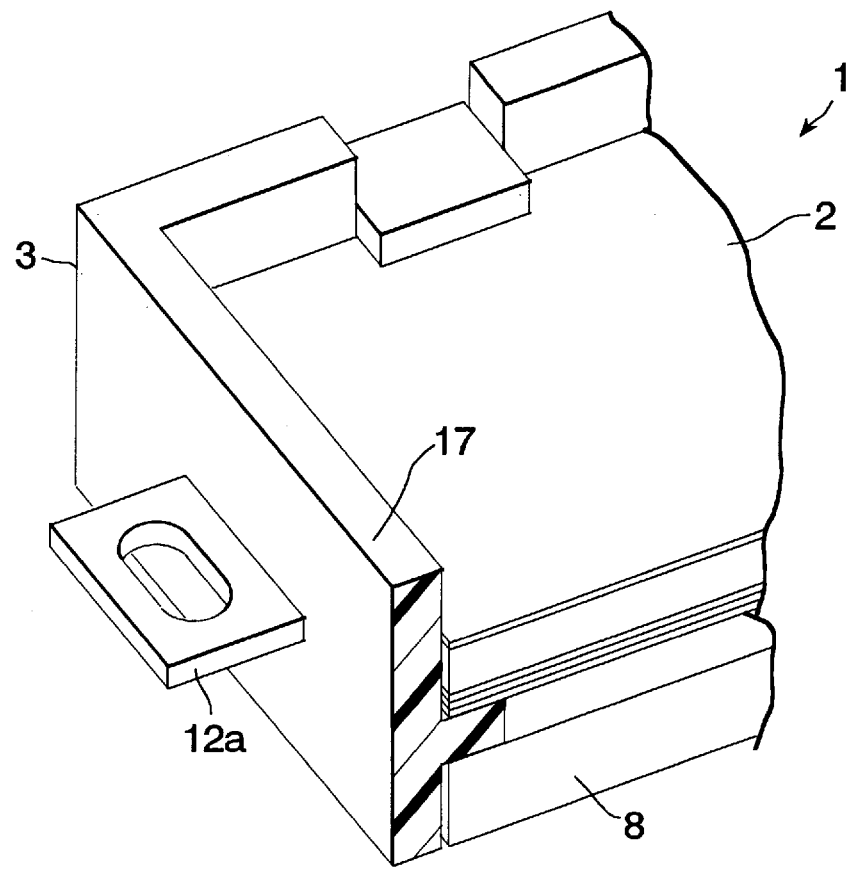
FIG. 6 is a partial perspective view showing a liquid crystal panel unit according to the present invention as viewed from a liquid crystal panel.

FIG. 6 illustrates a state where the liquid crystal panel containing frame 17 in the resin frame 3 is directed upward. The liquid crystal panel containing frame 17 is provided with the fastening portions 12a and 12b for fastening the liquid crystal panel unit 1 to the liquid crystal display itself. A height Hp (see FIG. 3), from the upper surface of the supporting shelf SH, of the inner wall portions 19a, 19b, 19c and 19d of the liquid crystal panel containing frame 17 is set to a height larger than that of a top glass surface of the liquid crystal panel 2 in a state where the liquid crystal panel 2 is contained in the liquid crystal panel containing frame 17. As a result, when the resin frame 3 in which the liquid crystal panel 2 is contained in the liquid crystal panel containing frame 17 is mounted on the liquid crystal display itself, the liquid crystal panel containing frame 17 protects, even if a pressing force is applied to the cabinet of the main body of the liquid crystal display which covers the periphery of the liquid crystal panel 2, the glass surface of the liquid crystal panel 2 contained therein upon receipt of the pressing force.

The liquid crystal panel 2 and the liquid crystal panel containing frame 17 are fixed to each other with double-coated tape. When the double-coated tape is affixed to the liquid crystal panel containing frame 17, and the liquid crystal panel 2 is pressed down from above, the liquid crystal panel 2 is fixed to the liquid crystal panel containing frame 17. As described above, the components constituting the back light unit have been already mounted on the back light component containing frame 10. Therefore, the liquid crystal panel 2 is contained in the liquid crystal panel containing frame 17, to complete the liquid crystal panel unit 1. In FIG. 6, the upper surface and the lower surface of the liquid crystal panel unit 1 are respectively supported by the liquid crystal panel 2 and the photoconductive plate 8, so that the liquid crystal panel unit 1 has sufficient unit strength.

Figure 7:
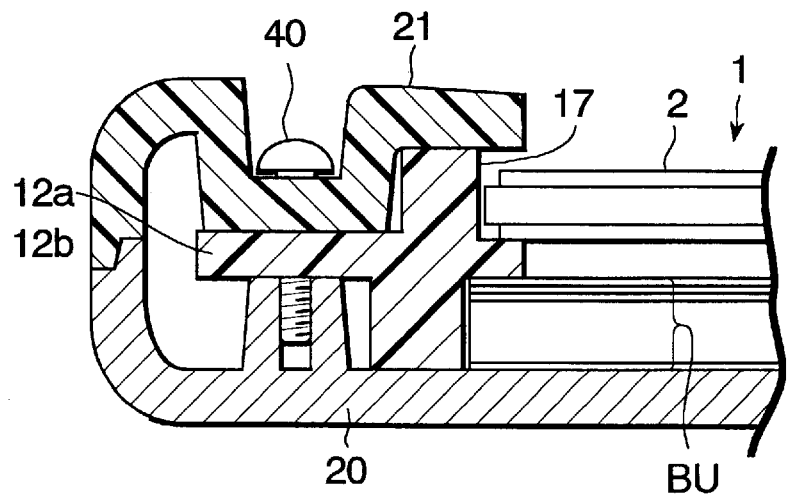
FIG. 7 is a cross-sectional view showing a fastening portion between the liquid crystal panel unit according to the present invention and a cabinet of a main body of a liquid crystal display.

Referring to FIG. 7, description is made of a method of fastening the liquid crystal panel unit 1 and the cabinet of the main body of the liquid crystal display. The liquid crystal panel unit 1 is put on a cabinet 20 for supporting the liquid crystal panel unit 1 and is covered with a cover 21 from above, and the fastening portions 12a and 12b are fixed thereto by screws 40, to complete the liquid crystal display. The cabinet 20 is formed of a magnesium alloy, and the cover 21 is formed by molding resin.

The cover 21 is low in rigidity because it is a molded resin product. When the upper surface of the cover 21 is strongly pressed, it is deformed and is curved downward. Therefore, the height of the liquid crystal panel containing frame 17 in the present embodiment extends beyond the top glass surface of the liquid crystal panel 2 so that no stress is applied to the liquid crystal panel 2.

Since the magnesium alloy which is high in rigidity is used for the cabinet 20, the liquid crystal panel unit 1 can be protected from destruction even when it receives an excessive shock by erroneously dropping the liquid crystal display itself. Even if aluminum or the like is used in place of the magnesium alloy, the same effect can be obtained.

As described in the foregoing, the liquid crystal panel unit 1 according to the present embodiment has a structure in which it can be assembled without requiring other components or screws for fastening and fixing because the resin frame 3 has functional components for positioning and holding the components constituting the back light unit. Consequently, it is possible to realize a liquid crystal display which is easy to assemble, is high in assembly precision of the components constituting the back light unit, is lightweight, and is thin.

Although description was made of the present invention on the basis of the above-mentioned embodiment, the present invention is not limited to the above-mentioned embodiment. For example, another positioning member may be used in place of the walls of the containing frames for positioning the liquid crystal panel and the components constituting the back light unit. Although the height of the wall of the liquid crystal panel containing frame extends beyond the glass surface of the liquid crystal panel so that no pressing force is exerted on the glass surface when the cabinet containing the liquid crystal panel unit is pressed, a projection can be added to a place other than the liquid crystal panel containing frame to disperse the pressing force. Further, adhesives (e.g., epoxy adhesives or rubber adhesives) may be thinly applied to the liquid crystal panel containing frame 17 in place of the double-coated tape, to bond and fix the liquid crystal panel 2.

Figure 8:
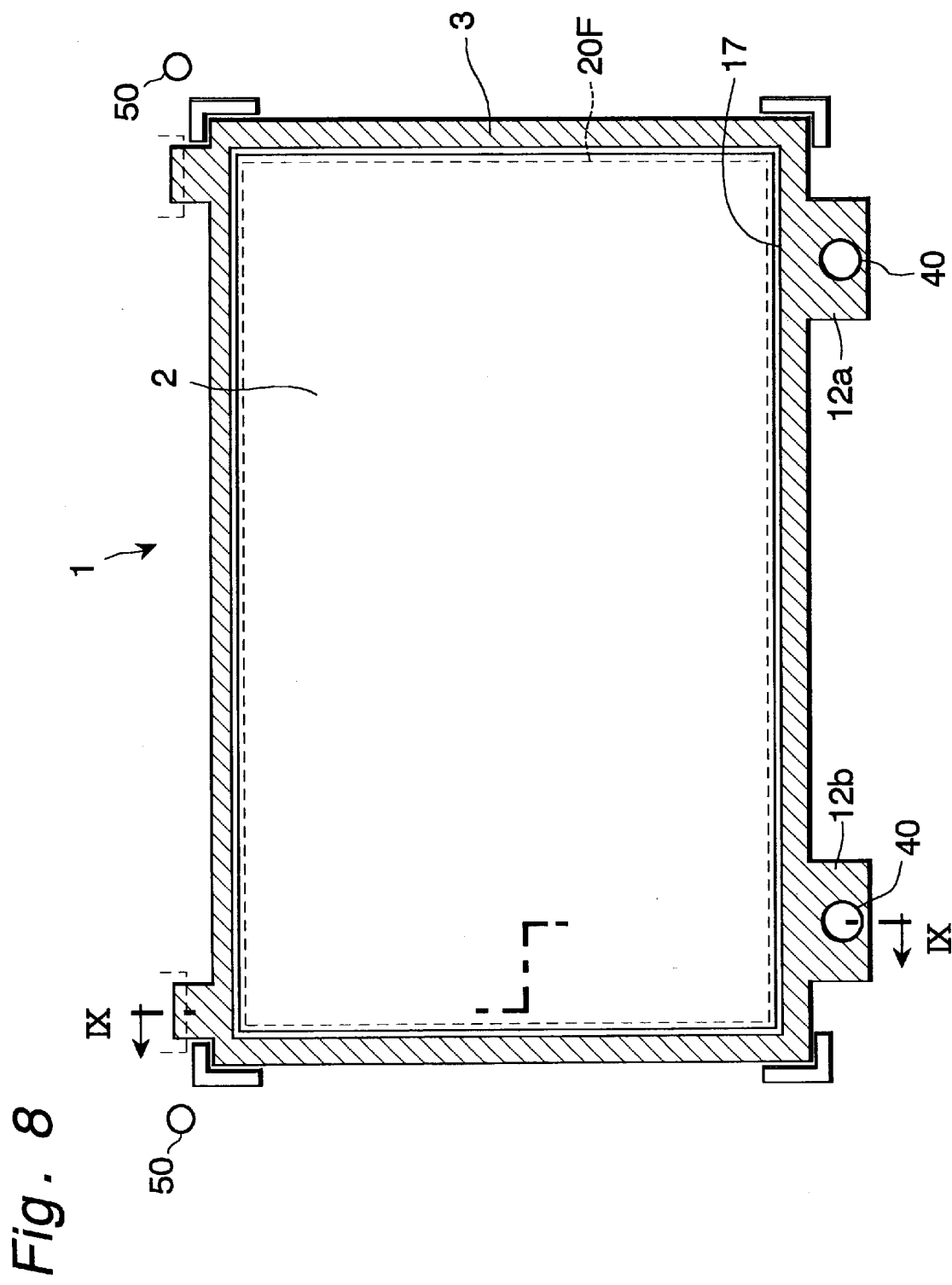
FIG. 8 is a plan view showing the main body of the liquid crystal display according to the present invention as viewed from a liquid crystal panel.
Figure 9:
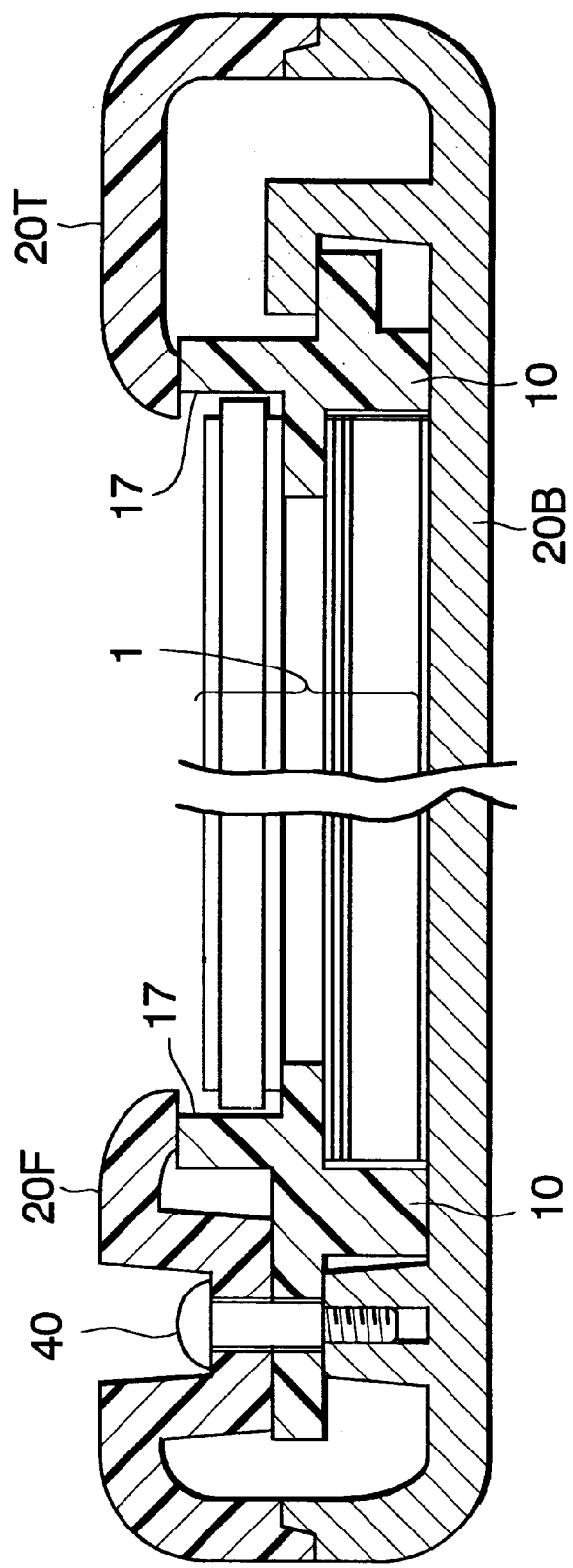
FIG. 9 is a cross-sectional view taken along a line IX—IX in the liquid crystal display shown in FIG. 8.

Referring to FIGS. 8 and 9, description is made of a mounting structure of the liquid crystal panel unit 1 according to the present embodiment to the cabinet of the main body of the liquid crystal display. Although the liquid crystal panel unit 1 which is given rigidity by the liquid crystal panel 2 and the photoconductive plate 8 has sufficient strength in normal handling, the rigidity thereof is insufficient only by the liquid crystal panel unit 1 with respect to abnormal stress such as a drop impact. In the present embodiment, the liquid crystal panel unit 1 is contained in a cabinet composed of a metal such as a magnesium alloy or aluminum which is high in rigidity in order to compensate for the rigidity of the liquid crystal panel unit 1.

In FIG. 8, a plan view of the liquid crystal panel unit 1 accommodated in a metallic case (not depicted in the drawing) is shown. Inside the case, a pair of screws 50 are provided at positions opposite to the fastening portions 12a and 12b with respect to the resin frame 3.

As shown in FIG. 9, the cabinet 20 is constituted by a frame-shaped upper case 20T composed of resin and a plate-shaped lower case 20B composed of a metal. The liquid crystal panel unit 1 is contained with it being interposed between the upper case 20T and the lower case 20B. The liquid crystal panel unit 1 is mounted on the upper case 20T and the lower case 20B with a clearance by catching its two corners and fastening its two corners using screws with steps.

The frame of the upper case 20T is made flexible in a projected shape toward the liquid crystal panel. When screws 40 are tightened, a projection 20F is fixed to the liquid crystal panel containing frame 17 with the liquid crystal panel unit 1 held therein. Since the liquid crystal panel containing frame 17 is supported by the flexible force of the frame, the necessity of another component is eliminated, thereby making it possible to reduce the number of steps and amount of time needed to assemble the liquid crystal panel unit 1 to the cabinet 20 than when a soft cushioning material is utilized. The liquid crystal panel unit may be interposed between the upper case and the lower case through the cushioning material in place of the flexibility of the frame. This is effective for a case where surface flaws, for example, must be protected.

As described in the foregoing, the liquid crystal display according to the present invention is so constructed that the containing frames containing the liquid crystal panel and the photoconductive plate which are respectively rigid are provided on the upper and lower surfaces of the flexible and lightweight resin frame to improve the strength of the cabinet containing the liquid crystal panel unit so that other fastening members and screws are not used f or holding the components constituting the back light unit. Consequently, it is possible to provide a liquid crystal display which is simple in construction, has a small number of components, is thin, and is lightweight. Further, it is possible to reduce the number of assembly processes.

Second Embodiment

Figure 10:
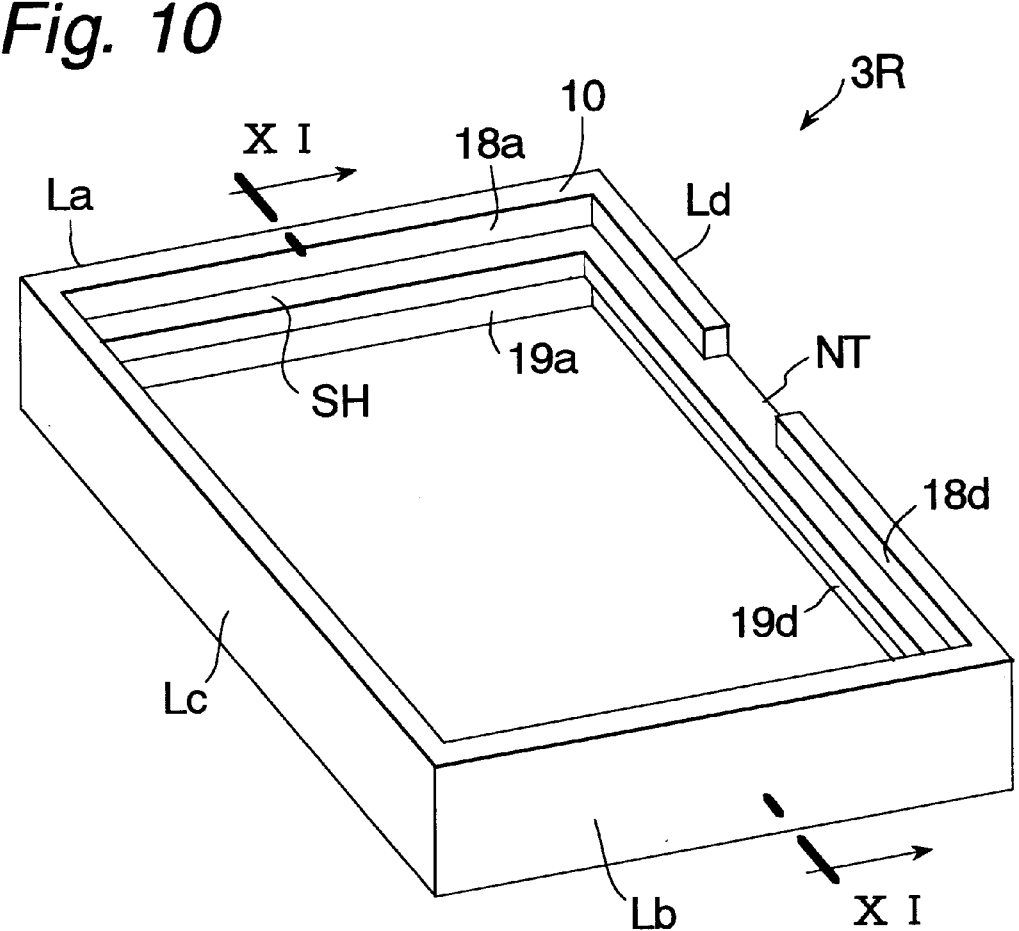
FIG. 10 is a perspective view, in a resin frame, of a supporting member for supporting components constituting a back light unit in a liquid crystal display according to a second embodiment of the present invention.
Figure 11:
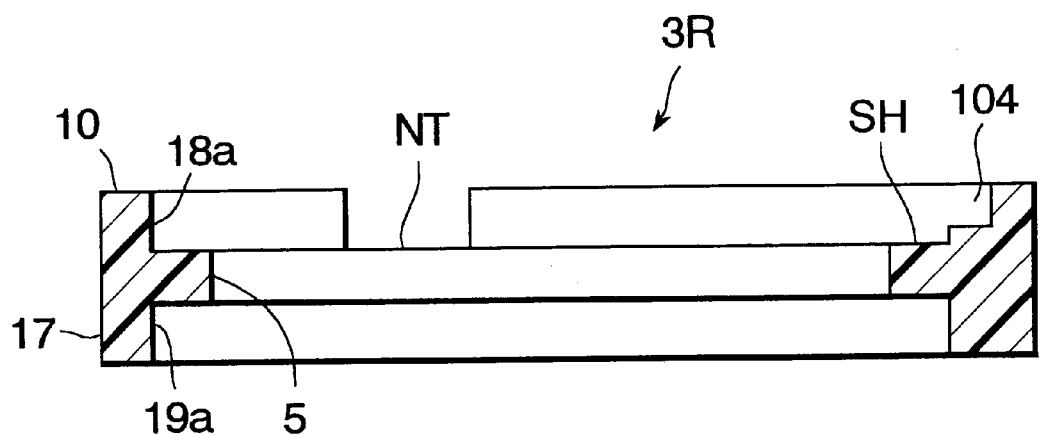
FIG. 11 is a cross-sectional view taken along a line XI—XI in the resin frame shown in FIG. 10.

Referring to FIGS. 10 and 11, description is made of a supporting member for supporting components constituting a back light unit in liquid crystal display according to a second embodiment. As shown in FIG. 10, a resin frame 3R acc structure very similar to the resin frame 3 according to the first embodiment. The resin frame 3R is basically the same as the resin frame 3 except that a notch portion NT leading to a supporting shelf SH is formed on one of four side walls La, Lb, Lc and Ld forming a back light component containing frame 10, for example, the side wall Ld. Although the notch portion NT may be provided in any part of one of the side walls La, Lb, Lc and Ld forming the back light component containing frame 10, it must be slightly shifted from the center along the length of the side wall. In other words, the notch portion NT is provided at a position shifted from the center of the side wall along the length of the side wall by a predetermined distance.

As shown in FIG. 11, a light source containing portion 104 is formed inside the back light component containing frame 10 in this example. There are also provided back light component holding claws 11$a$1, 11$a$2, 11$a$3, 11$b$1 and 11$b$2 for holding the components constituting the back light unit, which are not illustrated.

Figure 12:
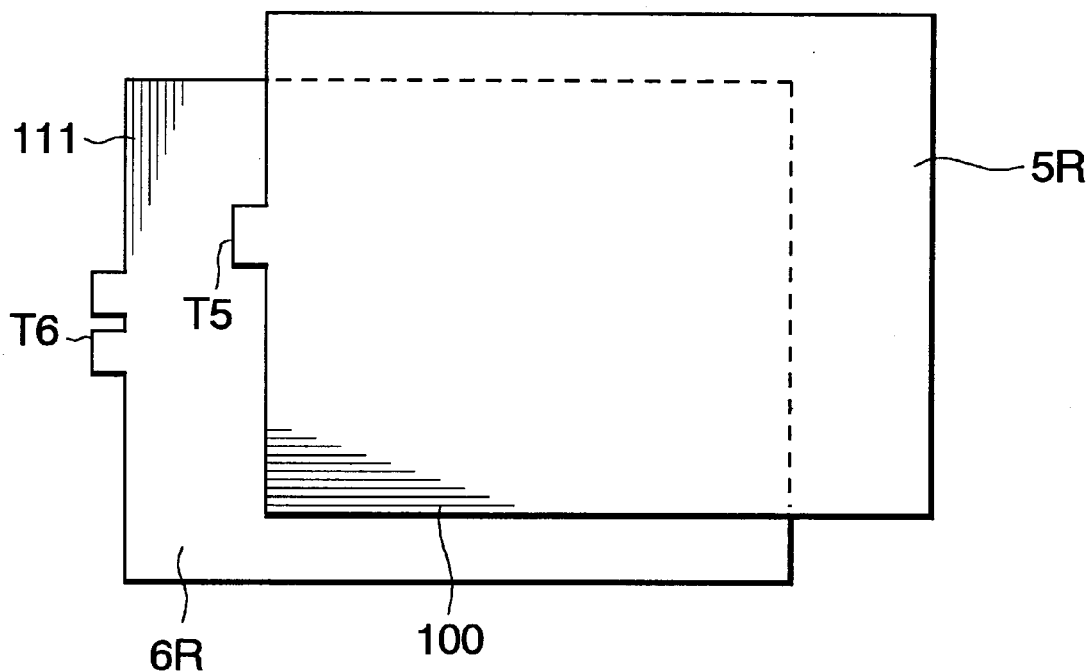
FIG. 12 is a front view of lens sheets according to the present invention.

Referring to FIG. 12, description is made of lens sheets 5R and 6R according to the present embodiment. The lens sheets 5R and 6R are basically constructed similarly to the lens sheets 5 and 6 used in the first embodiment. The lens sheets 5R and 6R are respectively provided with tabs T5 and T6 having shapes, as illustrated, outside their angles of view.

The tabs T5 and T6 are respectively provided in such positions that they are contained in the notch portion NT when the lens sheets 5R and 6R are inserted into the back light component containing frame 10 in the resin frame 3. Each of the tab T5 and T6 has, when the lens sheet 5R and the lens sheet 6R are overlapped with each other, a shape which is composed of a portion where they are overlapped with each other and a portion where they are not overlapped with each other. FIG. 12 illustrates an example in which the tab T5 has such a shape that one tab is projected from the lens sheet 5R, and the tab T6 has such a shape that two tabs are projected from the lens sheet 6R. The tab T5 and the tab T6 may be in various shapes, provided that they can satisfy a request to have, when the lens sheet 5R and the lens sheet 6R are overlapped with each other, a shape which is composed of a portion where they are overlapped with each other and a portion where they are not overlapped with each other. For example, one of the tabs may be in the same projected shape as the shape of the tab T5, and the other tab may be one obtained by providing the tab T5 with a hole.

A base material of the lens sheets 5R and 6R is, for example, a polyester film having a predetermined film thickness TR (TR=145 m), and arrays of very small prisms 100 and 111 each having a pitch of 30 to 50 m which are composed of acrylic resin are respectively provided on their surfaces. The arrays of prisms 100 and 111 are provided in directions perpendicular to each other when the lens sheets 5R and 6R are overlapped with each other. Reasonably, the tabs T5 and T6 also respectively have the arrays of prisms 100 and 111 which are perpendicular to each other when the lens sheets 5R and 6R are overlapped with each other. The lens sheets 5R and 6R are respectively mounted on the resin frame 3R such that their surfaces having the arrays of prisms 100 and 111 are directed toward the liquid crystal panel 2 and their surfaces opposite to the arrays of prisms 100 and 111 are directed toward a plane of incidence of light emitted from a light source.

The lens sheets 5R and 6R are for concentrating diffused light incident from the diffusion sheet 7 toward a viewer by the function of the prisms, thereby making it possible to almost double the luminance of light which reaches the viewer. The lens sheets 5R and 6R not only differ in the direction in which the prisms are arranged but also are contrived such that the viewing angle in the directions of the X and Y axes, the luminance, and the sharpness are most suitable by changing the material, the prism pitch, the prism angle, and so forth. Consequently, the lens sheets 5R and 6R must be assembled such that one of the surface and the reverse surface of each of the lens sheets is not mistaken for the other, an erroneous number of sheets are not inserted, and the sheets are not inserted in an erroneous order.

Description is now made of a method of assembling the back light unit. The lens sheet 5R is first contained in the back light component containing frame 10 in the resin frame 3 by aligning the tab T5 and the notch portion NT. Since the notch portion NT is provided in a position shifted from the center of the side wall of the supporting member, the tab T5 is not contained in the notch portion NT if one of the surface and the reverse surface of the lens sheet 5R is mistaken for the other. Consequently, the lens sheet 5R can be contained in the back light component containing frame 10 without mistaking one of the surface and the reverse surface of the lens sheet 5R for the other, that is, without erroneously directing the surface where the prisms are formed. The lens sheet 5R may be positioned on the basis of the peripheries of inner walls 18$a$, 18$b$, 18$d$ and 18$c$ of the resin frame 3 and the lens sheet 5R, as described in relation to the first embodiment, and may not be positioned on the basis of the tab T5. The lens sheet 6R is then contained in the same manner.

Thereafter, the diffusion sheet 7, a photoconductive plate 8, and a reflection sheet 9 are successively mounted in the same procedure, and an electric-discharge lamp 4 is finally mounted, to complete a back light unit BU. In the actual assembly process, the diffusion sheet 7, the photoconductive plate 8, and the reflection sheet 9 are inserted upon being previously integrated with tape 16. If the lens sheets 5R and 6R are correctly mounted, therefore, the components constituting the back light unit are not erroneously mounted in the subsequent processes.

Figure 13:
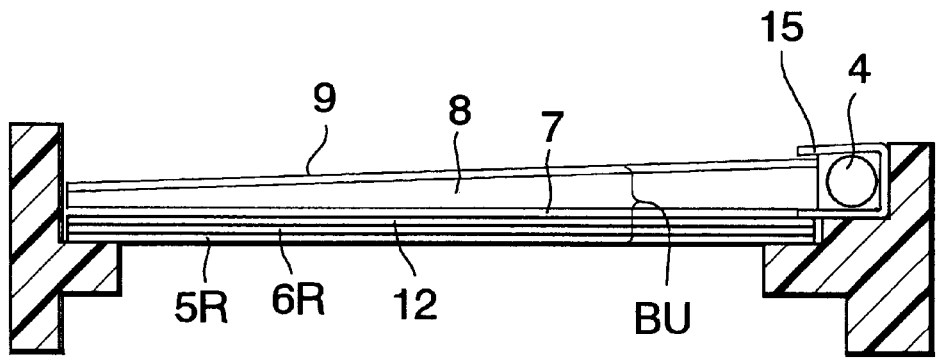
FIG. 13 is a cross-sectional view of a completed back light unit according to the second embodiment.

FIG. 13 illustrates the cross section of the completed back light unit.

Figure 15:
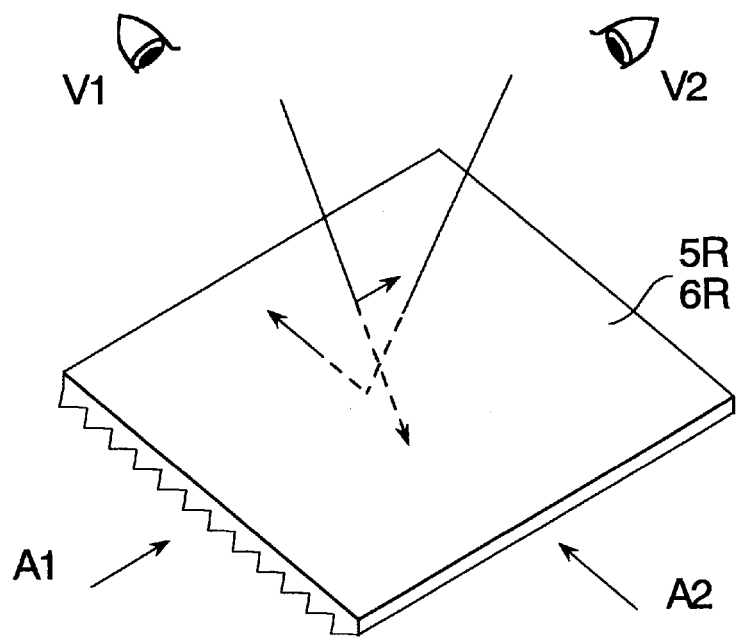
FIG. 15 is an explanatory view showing reflection on the reverse surface of a lens sheet according to the second embodiment.
Figure 18:
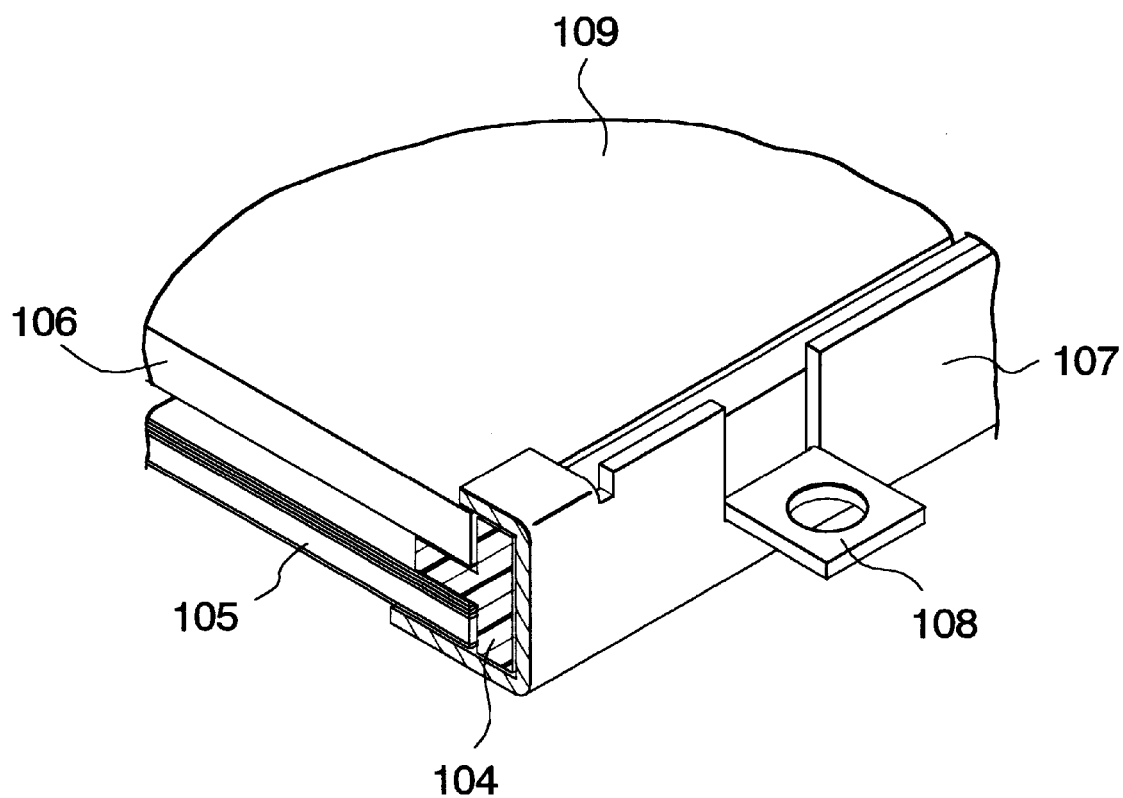
FIG. 18 is a perspective view showing the structure of a fastening member in the conventional liquid crystal panel unit.
Figure 19:
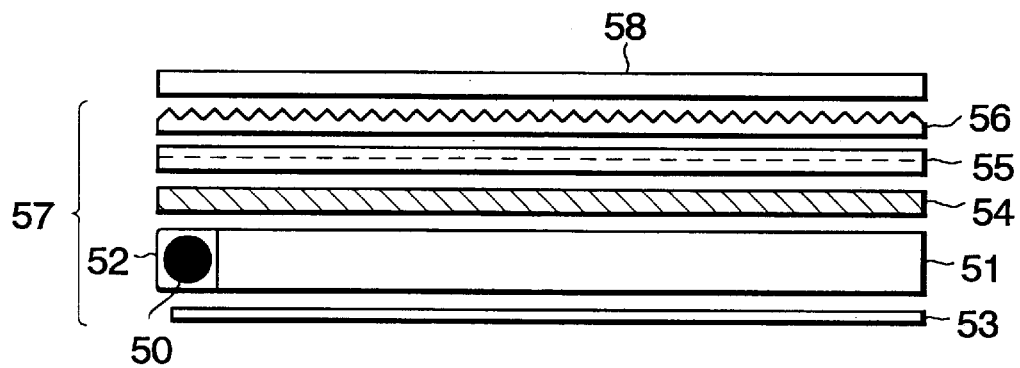
FIG. 19 is a cross-sectional view showing the construction of a conventional liquid crystal display.
Figure 20:
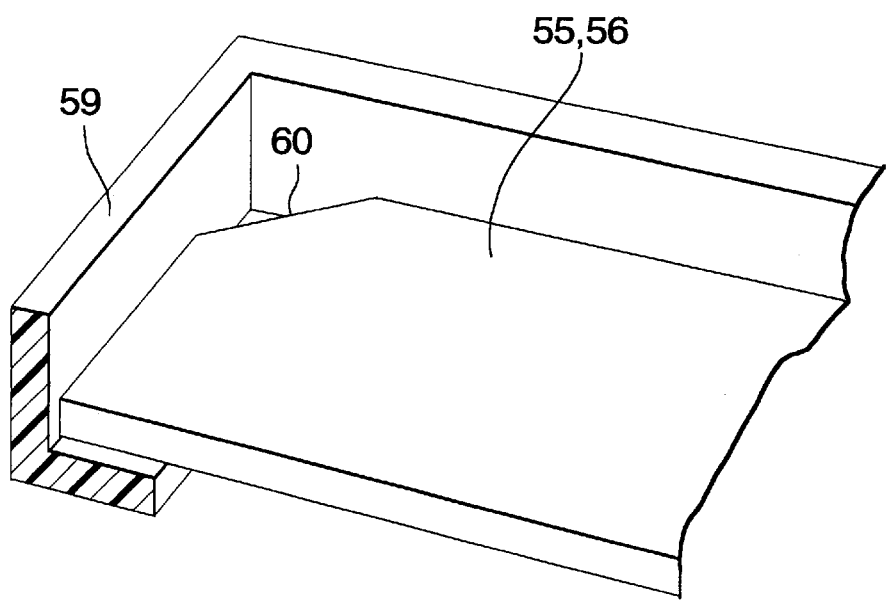
FIG. 20 is a partial perspective view showing the positioning of lens sheets in the conventional liquid crystal display.

Referring to FIG. 15, description is made of a method of distinguishing the respective directions in which the prisms 100 and 111 are arranged utilizing the optical characteristics of the lens sheets 5R and 6R. FIG. 15 is a diagram in which the lens sheets 5R and 6R respectively having surfaces, each provided with the prisms, directed downward are viewed by light reflected from the lens sheets 5R an 6R from the positions of view points V1 and V2. The view point V1 is one where the eye of the viewer is directed along arrow A1 parallel to the array of prisms. In this case, much of light incident on the base material of the lens sheet is reflected by a prism surface, to reach the eye (V1) of the viewer after passing through the base material again, so that the view point V1 seems brilliant like a mirror surface. The view point V2 is one where the eye is directed along arrow A2 perpendicular to the array of prisms. In this case, much of the light passes through the base material film and the prisms, so that the view point V2 seems dark.

Referring to FIG. 15, description is made of a method of distinguishing the respective directions in which the prisms 100 and 111 are arranged utilizing the optical characteristics of the lens sheets 5R and 6R. FIG. 15 is a diagram in which the lens sheets 5R and 6R respectively having surfaces, each provided with the prisms, directed downward are viewed by light reflected from the lens sheets 5R and 6R from the positions of view points V1 and V2. The view point V1 is one in a case where the eye of the viewer is put in an arrow see view A1 parallel to the array of prisms. In this case, much of light incident on the base material of the lens sheet is reflected by a prism surface, to reach the eye (V1) of the viewer after passing through the base material again, so that the view point V1 seems brilliant like a mirror surface. The view point V2 is one in a case where the eye is put in an arrow see view A2 perpendicular to the array of prisms. In this case, much of light passes through the base material film and the prisms, so that the view point V2 seems dark.

It is possible to confirm the order in which the lens sheets 5R and 6R are inserted by observing the tabs T5 and T6 in the notch portion NT utilizing the above-mentioned phenomenon.

Figure 14:
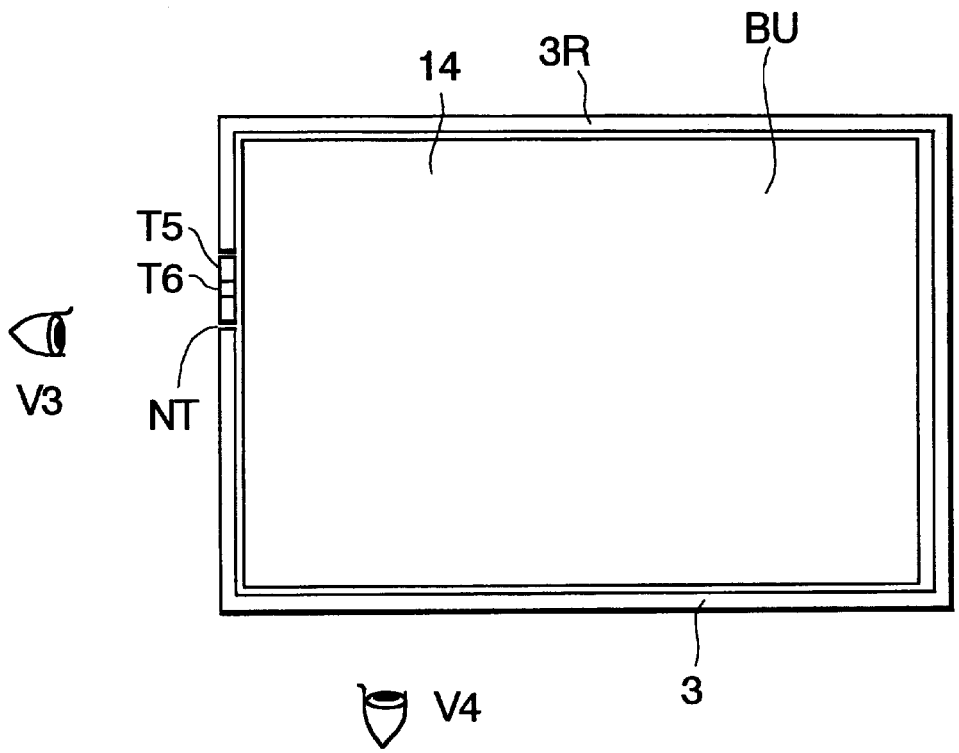
FIG. 14 is a front view of the completed back light unit according to the second embodiment.

Referring now to FIGS. 16A and 16B, description is made of images formed using light reflected from the tabs T5 and T6 which can be observed from a view point V3 in a direction parallel to the array of prisms 100 in FIG. 14. In this case, a bright part and a dark part are clearly observed in the light reflected from the tabs T5 and T6. In the present embodiment, the lens sheet 5R is first put, and the lens sheet 6R is put thereon, so that the order in which the recessed tab T6 is above the projected tab T5 is a correct order. The array of prisms is parallel to the position of the eye, and only its part exposed upward is brilliant. When the lens sheets 5R and 6R are inserted in a correct order, therefore, the observed bright part is long and narrow, as shown in FIG. 16A. On the other hand, when the lens sheets 5R and 6R are inserted in an erroneous order, the observed bright part is wide, as shown in FIG. 16B. As shown in FIGS. 16A and 16B, the difference in pattern therebetween is significant, and erroneous insertion can be simply found out.

In FIG. 14, if the view point is the view point V4 which is rotated by 90° from the view point V3, the bright and dark parts are replaced with each other. Therefore, FIG. 16A shows how the lens sheets 5 and 6 are seen in a case where they are erroneously arranged. On the other hand, FIG. 16B shows how the lens sheets 5 and 6 are seen in a case where they are correctly arranged.

Although in the above-mentioned embodiment description was made of an edge type back light unit, the present invention is also applicable to a back light unit of another type.

As described in the foregoing, the back light unit according to the present embodiment can be assembled without mistaking one of the surface and the reverse surface of each of a plurality of lens sheets for the other, and the number of lens sheets and the order in which the lens sheets are inserted can be simply confirmed by visual inspection after completion of the back light unit. The fabrication efficiency is improved, as compared with the conventional method, of detecting abnormalities in mounting the components of the back light unit, by operating the liquid crystal panel after completion of the liquid crystal display.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal display comprising a frame that is to unite a liquid crystal panel for displaying a desired image and a back light unit for lighting the liquid crystal panel, and be installed in a cabinet so that the liquid crystal panel displays the desired image clearly when the back light unit lights the crystal liquid panel from a backside thereof, with the back light unit comprising:
(i) a first lens sheet having first predetermined viewing angle characteristics, and also having a first tab with a first shape; and
(ii) a second lens sheet having second predetermined viewing angle characteristics which are different from the first viewing angle characteristics, and also having a second tab with a second shape; and with said frame comprising:
(i) a projection extending along an inner wall such that said inner wall is divided into first and second portions, with said first portion and said projection defining a first receiving structure that is to receive the liquid crystal panel, with said second portion and said projection defining a second receiving structure that is to receive the back light unit, and with said second receiving structure including a notch that is to receive the first and second tabs such that the first and second tabs partially overlap one another;
whereby when the liquid crystal panel is received by said first receiving structure and the back light unit is received by said second receiving structure with the first and second tabs received within said notch, the liquid crystal panel and the back light unit are united by said frame into a crystal panel unit.

2. The liquid crystal display according to claim 1, wherein said notch is located at a position that is offset from a center of a side section of said second portion of said inner wall.

3. The liquid crystal display according to claim 2, wherein said notch is located in said side section of said second portion of said inner wall, and said position at which said notch is located is offset from the center of said side section by being offset from a mid-point of a length of said side section along the length of said side section.

4. The liquid crystal display according to claim 1, wherein said frame further includes claws extending from said second portion of said inner wall, for holding the back light unit when the back light unit is received by said second receiving structure.

5. The liquid crystal display according to claim 4, wherein said frame comprises a resin material.

6. The liquid crystal display according to claim 4, wherein said claws are spaced from said projection by a distance that is greater than a thickness of the back light unit.

7. The liquid crystal display according to claim 4, wherein said claws are spaced from said projection and include:
   a first holding claw having a flat configuration; and
   a second holding claw having an arched surface directed away from said projection and towards an interior defined by said inner wall;
   such that when the back light unit is to be received by said second receiving structure, the back light unit is first inserted between said first holding claw and said projection, then the back light unit is placed on said arched surface of said second holding claw and pressed against said arched surface, whereby the back light unit slides along said arched surface and then becomes inserted between said second holding claw and said projection.

8. The liquid crystal display according to claim 7, wherein said first holding claw is spaced from said projection by a first distance, and said second holding claw is spaced from said projection by a second distance, such that a thickness of the back light unit is not greater than the first distance and the first distance is not greater than the second distance.

9. The liquid crystal display according to claim 7, wherein said first holding claw is spaced from said projection by a first distance, and said second holding claw is spaced from said projection by a second distance, such that the first distance is not greater than a thickness of the back light unit and the thickness of the back light unit is not greater than the second distance.

10. The liquid crystal display according to claim 7, wherein said inner wall comprises at least three inner wall segments, with said first holding claw being provided on a first of said at least three inner wall segments and said second holding claw being provided on a second of said at least three inner wall segments that is adjacent said first of said at least three inner wall segments.

11. The liquid crystal display according to claim 7, wherein said inner wall comprises at least three inner wall segments, with said first holding claw being provided on a first of said at least three inner wall segments and said second holding claw being provided on a second of said at least three inner wall segments that is separated from said first of said at least three inner wall segments by at least a third of said at least three inner wall segments.

12. The liquid crystal display according to claim 7, wherein said inner wall comprises at least four inner wall segments, with said first holding claw being provided on a first of said at least four inner wall segments and said second holding claw being provided on a second of said at least four inner wall segments that is opposite said first of said at least four inner wall segments.

13. The liquid crystal display according to claim 1, wherein said frame further comprises fastening structure for fastening said frame to the cabinet.

14. The liquid crystal display according to claim 13, wherein the cabinet is made of a material selected from the group consisting of magnesium alloy and aluminum alloy.

15. The liquid crystal display according to claim 14, wherein the cabinet includes a pressing member to be positioned against said fastening structure and is for pressing an end portion of said inner wall against a bottom portion of the cabinet so that the liquid crystal panel unit can be installed in the cabinet via the fastening structure and the pressing member.

16. The liquid crystal display according to claim 15, wherein said frame further comprises additional fastening structure for fastening said frame to the cabinet, and the cabinet further includes an additional pressing member to be positioned against said additional fastening structure and is for pressing another end portion of said inner wall against another bottom portion of the cabinet so that the liquid crystal panel unit can be installed in the cabinet via the fastening structure, pressing member, additional fastening structure and additional pressing member.

17. The liquid crystal display according to claim 1, wherein said projection is spaced from and extends parallel to a side edge of said inner wall such that a distance from said projection to a side edge of said first portion of said inner wall is greater than a thickness of the liquid crystal panel.

18. The liquid crystal display according to claim 1, wherein said first receiving structure is to have the liquid crystal panel fixed thereto by an adhesive.

19. The liquid crystal display according to claim 1, wherein the back light unit includes an electric-discharge lamp for lighting the liquid crystal panel, and said second receiving structure further includes holding structure for holding an end portion of the electric-discharge lamp.

* * * * *